Figure 1:
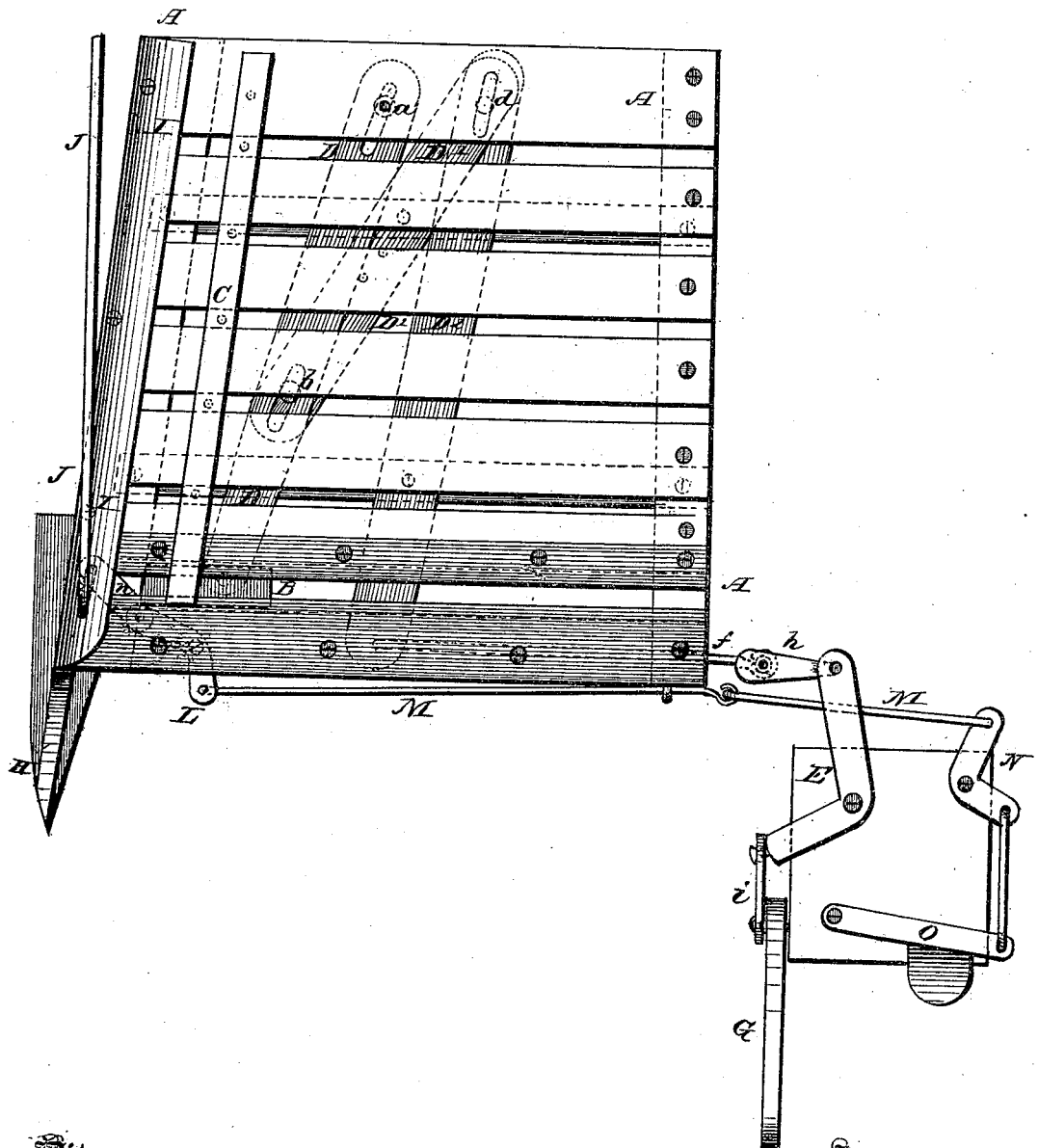

F. W. MUESING.
RAKE-ATTACHMENT FOR HARVESTER.

No. 178,456. Patented June 6, 1876.

F. W. MUESING.
RAKE-ATTACHMENT FOR HARVESTER.
No. 178,456. Patented June 6, 1876.
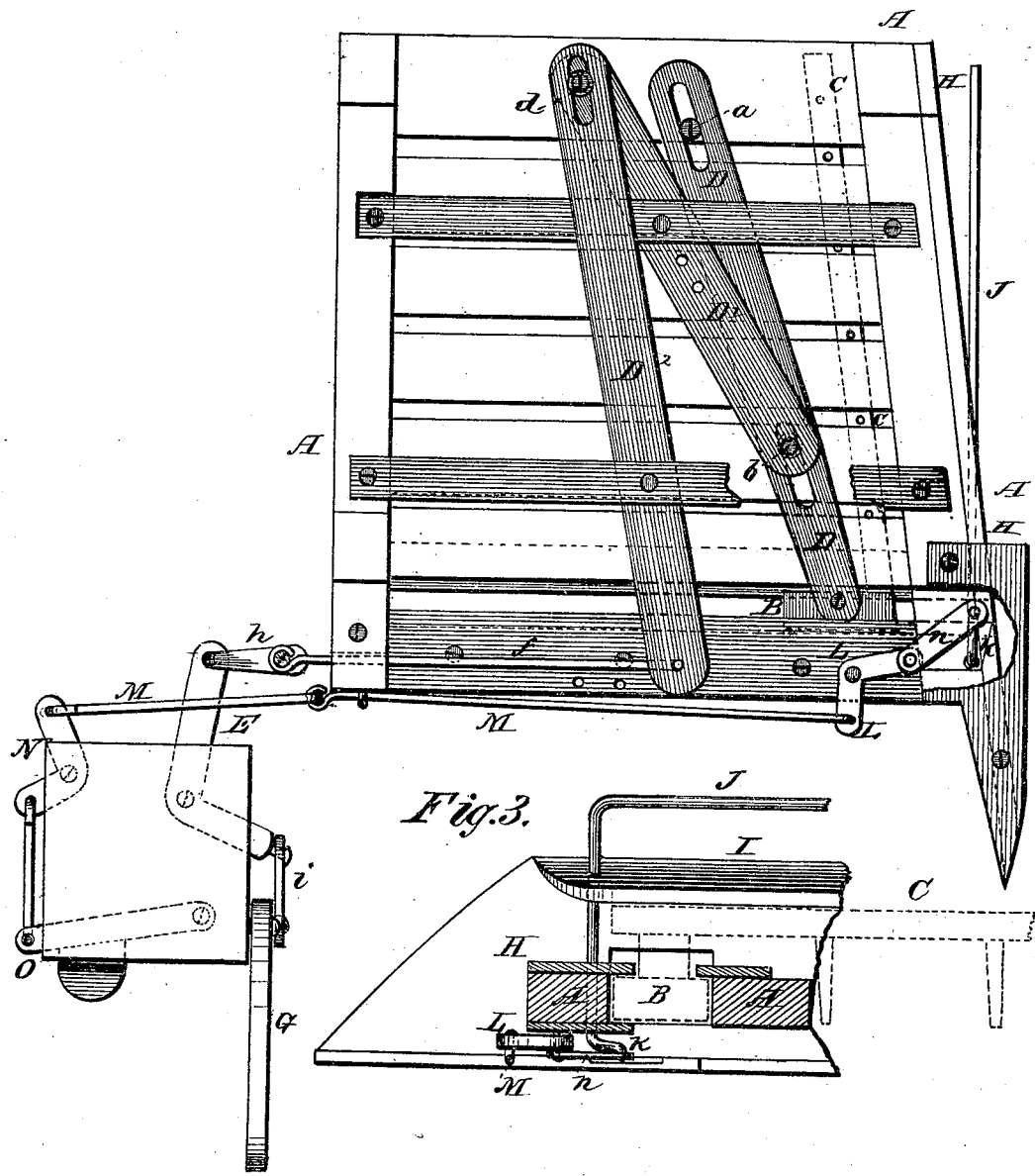

UNITED STATES PATENT OFFICE.

FREDRICK W. MUESING, OF KENDALLVILLE, INDIANA, ASSIGNOR TO HIMSELF AND GEORGE A. BRILLHART, OF SAME PLACE.

IMPROVEMENT IN RAKE ATTACHMENTS FOR HARVESTERS.

Specification forming part of Letters Patent No. 178,456, dated June 6, 1876; application filed March 21, 1876.

*To all whom it may concern:*

Be it known that I, FREDRICK W. MUESING, of Kendallville, in the county of Noble and State of Indiana, have invented certain new and useful Improvements in Rake Attachment for Reapers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a rake attachment for reapers, as will be hereinafter more fully set forth.

In the annexed drawings, Figure 1 is a plan view. Fig. 2 is a bottom view, and Fig. 3 is detail, partly in section.

A represents an ordinary slatted reaper-platform, provided immediately back of the finger-bar with a suitable way or guide, parallel with the same, for the head B of the rake to move in back and forth. C is the rake, secured to the head B, and extending to the back edge of the platform. The head B is attached on its under side to one end of a lever, D, the other end of which is slotted, and rides over a headed pin, $a$, in the under side, near the rear edge of the platform. A short distance from the rake-head B the lever D has another slot, through which passes a pin, $b$, in the end of another lever, $D^1$. This lever is pivoted to a cross-bar under the platform, and its other end has a pin, $d$, which enters a slot in the end of still another lever, $D^2$. This lever $D^2$ is also pivoted to another cross-bar under the platform, and its opposite end, which is nearly under the finger-bar, is, by a rod, $f$, connected with a swiveled crank, $h$, in the end of an elbow-lever, E, said elbow-lever being, by a link, $i$, connected with a hand-lever, G.

It will be seen that when the forward end of the lever $D^2$ is drawn inward it throws the forward ends of both the other levers, $D^1$ and D, also inward, and by means of the slots and pins, as described, which form, as it were, movable or shifting fulcrums, a very short movement of the front end of the lever $D^2$ throws the rake the entire distance from the outer to the inner end of the platform.

Along the outer edge of the platform, and extending backward from the outer shoe thereof, is a board, H, with upper inclined flange I, under which the rake is placed while the grain collects on the platform. J is the cut-off rod, attached to, or forming at its end a vertical shaft passing through the flange, and having an arm, $k$, on its lower end below the platform. This arm is, by a rod, $r$, connected with an elbow-lever, L, and this is, by a jointed rod, M, connected with another elbow-lever, N, operated by means of a foot-lever, O. By this means the cut-off rod may be thrown forward to hold up the grain while the rake is traversing the platform, and as soon as the rake returns under the flange I the rod J is thrown back again, to allow the grain to fall onto the platform.

Having thus fully described my invention, what I claim as new, and desire to secure by Letters Patent, is—

The combination, with a slatted platform A, of the rake-head B, rake C, and the levers D $D^1$ $D^2$, constructed, as described, with slots and pins, forming movable fulcrums, and operated by the levers E G, substantially as and for the purposes herein set forth.

In testimony that I claim the foregoing as my own I affix my signature in presence of two witnesses.

FREDRICK W. MUESING.

Witnesses:
FREDERICK KIEL,
GEO. W. SAYLES.